(12) United States Patent
Fujita

(10) Patent No.: US 8,564,744 B2
(45) Date of Patent: Oct. 22, 2013

(54) FLAT PANEL DISPLAY DEVICE

(75) Inventor: Daigo Fujita, Kanazawa (JP)

(73) Assignee: Japan Display Central Inc., Fukaya-shi (JP)

( * ) Notice: Subject to any disclaimer, the term of this patent is extended or adjusted under 35 U.S.C. 154(b) by 178 days.

(21) Appl. No.: 13/155,006

(22) Filed: Jun. 7, 2011

(65) Prior Publication Data

US 2012/0075548 A1  Mar. 29, 2012

(30) Foreign Application Priority Data

Sep. 29, 2010  (JP) ................. 2010-219916

(51) Int. Cl.
 *G02F 1/1335* (2006.01)
 *G02F 1/1333* (2006.01)

(52) U.S. Cl.
 USPC ............................ 349/95; 349/122

(58) Field of Classification Search
 USPC ........................... 349/95, 112, 122
 See application file for complete search history.

(56) References Cited

U.S. PATENT DOCUMENTS

| | | | |
|---|---|---|---|
| 5,745,199 A * | 4/1998 | Suzuki et al. | 349/95 |
| 6,628,353 B2 * | 9/2003 | Nakamura | 349/95 |
| 7,079,204 B2 * | 7/2006 | Hata | 349/101 |
| 7,244,476 B2 * | 7/2007 | Sumida et al. | 428/1.5 |
| 7,327,413 B2 * | 2/2008 | Hwang et al. | 349/58 |

FOREIGN PATENT DOCUMENTS

| | | |
|---|---|---|
| JP | 9-73072 A | 3/1997 |
| JP | 2002-72171 A | 3/2002 |
| JP | 2004-280087 A | 10/2004 |
| JP | 2008-89906 A | 4/2008 |
| JP | 2008-145551 | 6/2008 |
| JP | 2008-191325 A | 8/2008 |
| JP | 2008-219788 | 9/2008 |
| JP | 2010-60859 A | 3/2010 |

OTHER PUBLICATIONS

Office Action issued Sep. 25, 2012, in Japanese Patent Application No. 2010-219916 with English translation.

* cited by examiner

*Primary Examiner* — Dung Nguyen
(74) *Attorney, Agent, or Firm* — Oblon, Spivak, McClelland, Maier & Neustadt, L.L.P.

(57) ABSTRACT

According to one embodiment, a flat panel display device includes a flat display panel having a pair of long sides and a pair of short sides, a face panel disposed in front of the flat display panel, a lenticular lens array disposed on an inner surface of the face panel, the inner surface facing the flat display panel, and an adhesive disposed along at least one of the pair of long sides of the flat display panel and attaching the flat display panel and the face panel to each other.

15 Claims, 6 Drawing Sheets

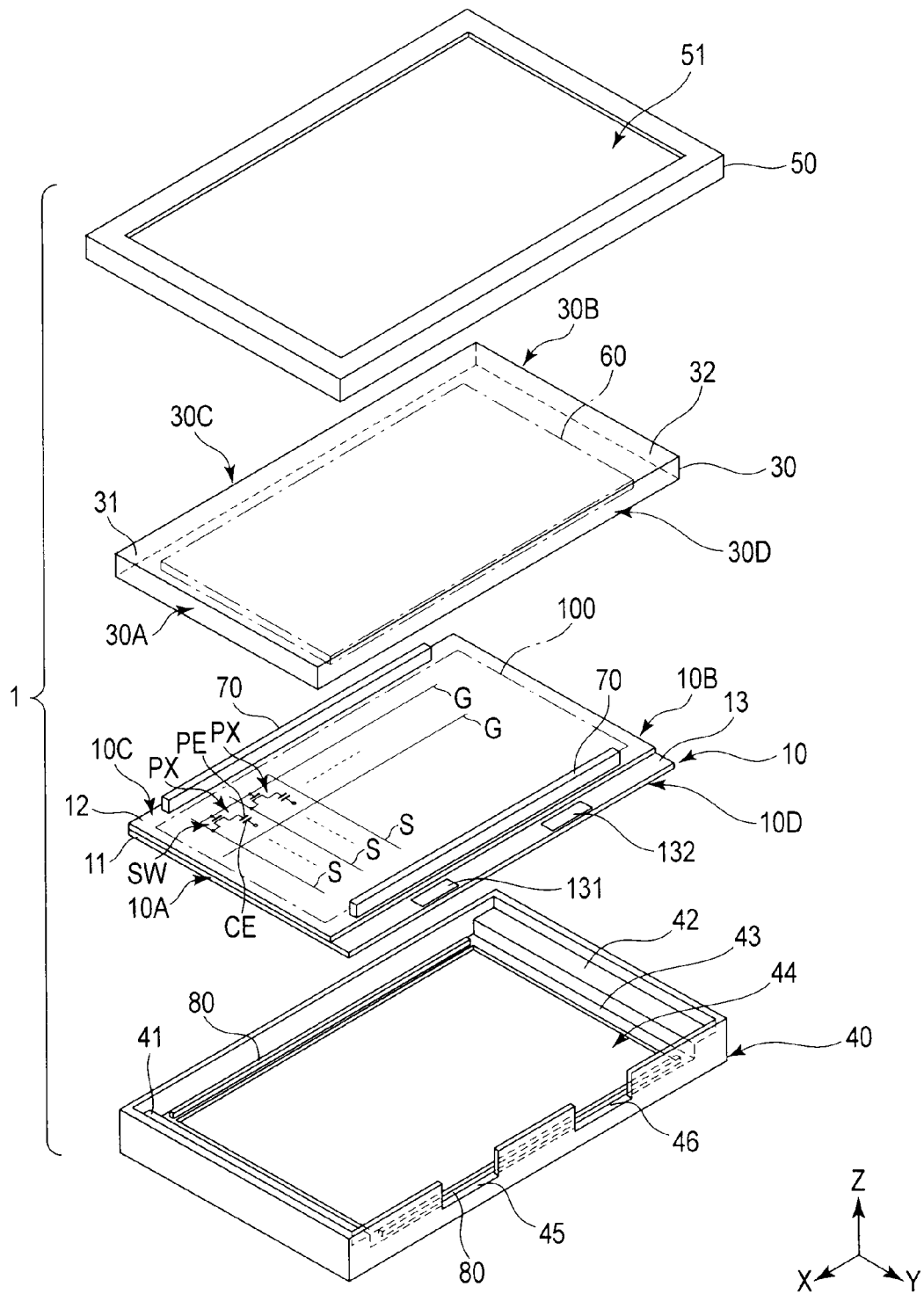
F I G. 1

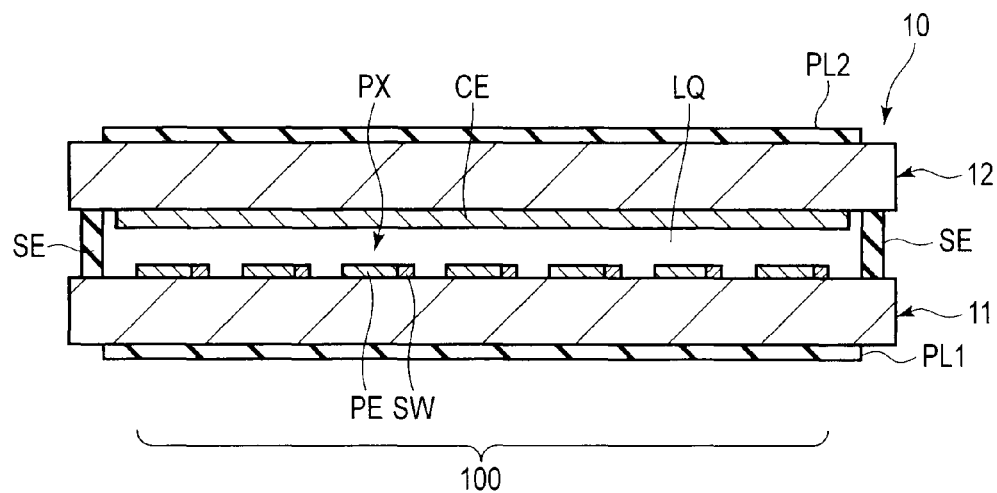
F I G. 2
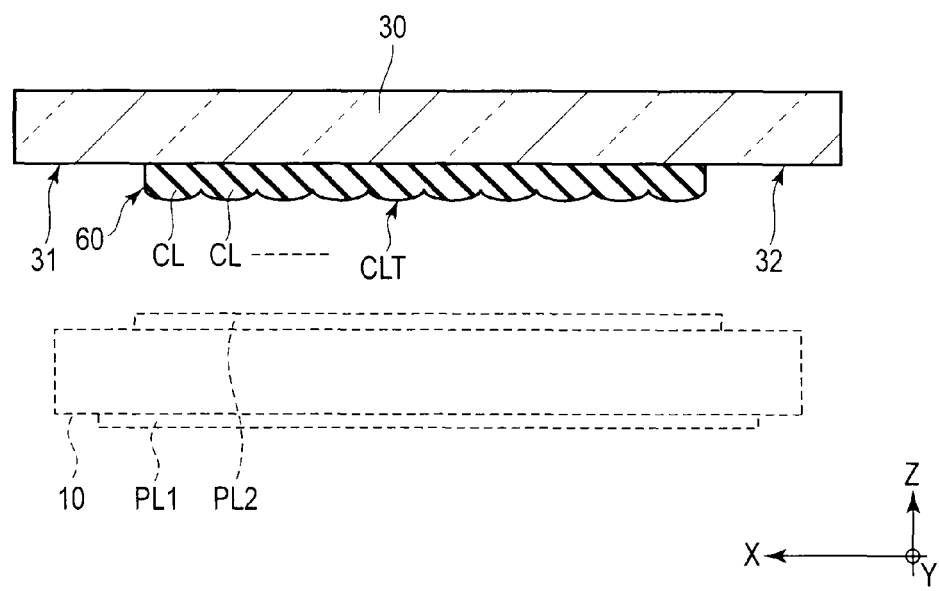
F I G. 3

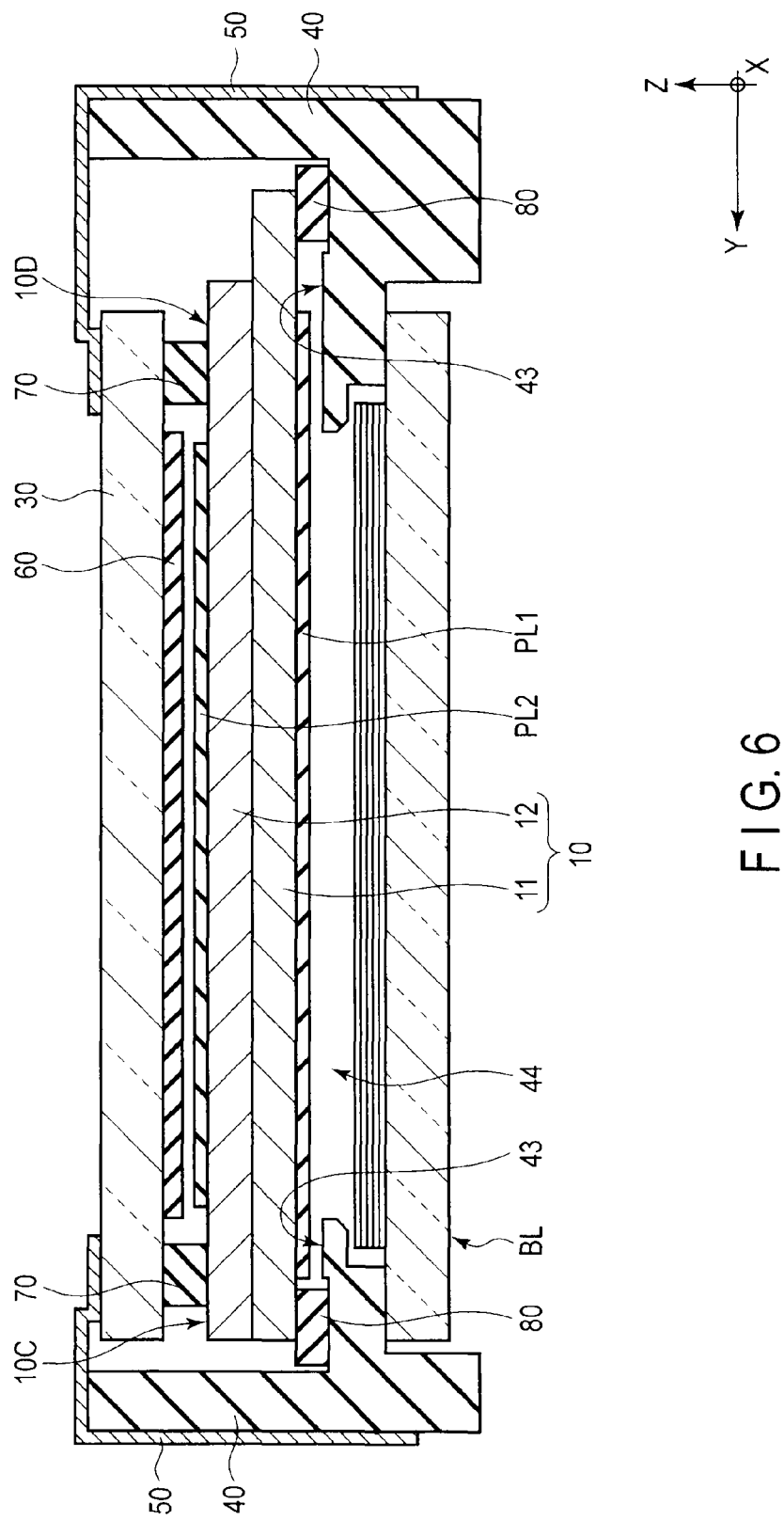
F I G. 6

FLAT PANEL DISPLAY DEVICE

CROSS-REFERENCE TO RELATED APPLICATIONS

This application is based upon and claims the benefit of priority from Japanese Patent Application No. 2010-219916, filed Sep. 29, 2010; the entire contents of which are incorporated herein by reference.

FIELD

Embodiments described herein relate generally to a flat panel display device.

BACKGROUND

By virtue of such features as light weight, small thickness and low power consumption, flat panel display devices, which are represented by a liquid crystal display device and an organic electroluminescence display device, have been used as various display devices of OA equipment such as a personal computer, a TV, a mobile terminal device such as a mobile phone, a car navigation apparatus, and an amusement device.

In recent years, a liquid crystal display device having a stereoscopic display function has been proposed. For example, a stereoscopic display device according to an integral imaging system has such a structure that a lenticular sheet (a sheet in which a large number of cylindrical lenses each having a semicircular cross section are arranged) and a liquid crystal display panel are combined. Compared to a method in which a parallax barrier is formed in front of a liquid crystal display panel or a method in which shutters by means of glasses are disposed, this system has such merits that the light ray transmittance is higher, the power consumption is lower, and a natural stereoscopic view is realized since glasses are needless.

BRIEF DESCRIPTION OF THE DRAWINGS

FIG. 1 is an exploded perspective view which schematically shows a main part of a liquid crystal display device that is an example of an embodiment.

FIG. 2 is a cross-sectional view which schematically shows the structure of a liquid crystal display panel in the liquid crystal display device shown in FIG. 1.

FIG. 3 is a cross-sectional view which schematically shows the structure of a face panel which holds a lenticular lens array in the liquid crystal display device shown in FIG. 1.

FIG. 6 is a cross-sectional view which schematically shows a cross-sectional structure, taken along line B-B, of the liquid crystal display device in which the liquid crystal display panel and face panel shown in FIG. 4 are accommodated in the frame.

DETAILED DESCRIPTION

Figure 4:
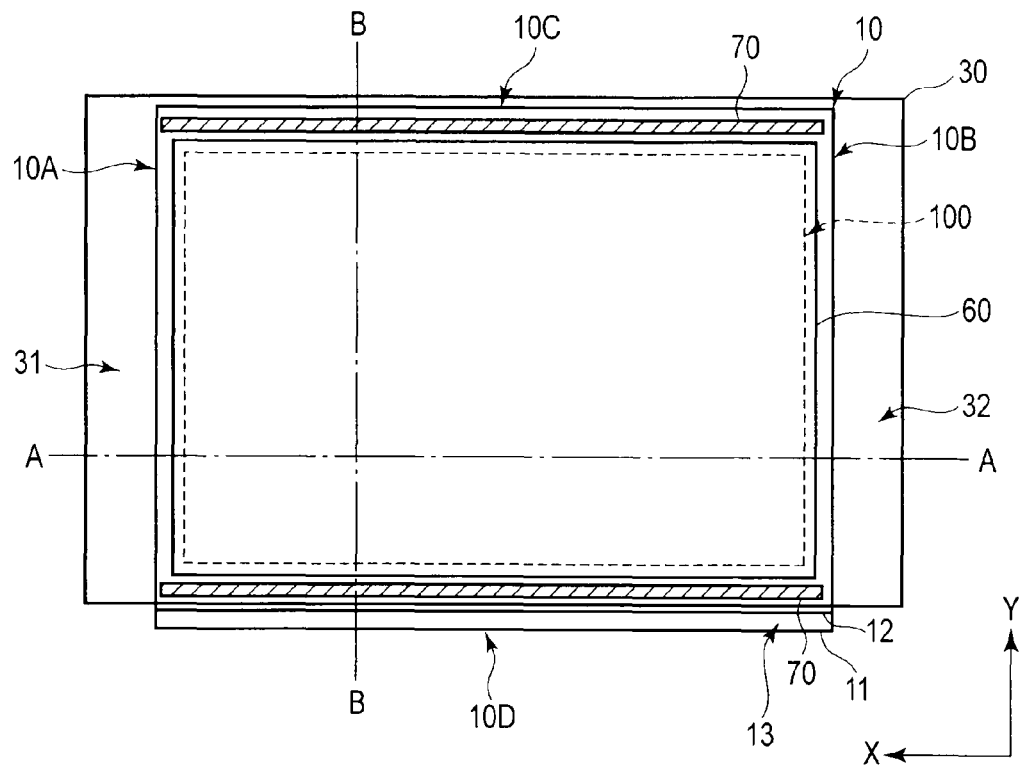
FIG. 4 is a plan view which schematically shows the structure of the liquid crystal display panel and the face panel which are attached by an adhesive.

In general, according to one embodiment, a flat panel display device includes a flat display panel having a pair of long sides and a pair of short sides; a face panel disposed in front of the flat display panel; a lenticular lens array disposed on an inner surface of the face panel, the inner surface facing the flat display panel; and an adhesive disposed along at least one of the pair of long sides of the flat display panel and attaching the flat display panel and the face panel to each other.

The embodiment will now be described in detail with reference to the accompanying drawings. In the drawings, structural elements having the same or similar functions are denoted by like reference numerals, and an overlapping description is omitted. In the description below, a liquid crystal display device is described as an example of the flat panel display device of the embodiment.

FIG. 1 is an exploded perspective view which schematically shows a main part of a liquid crystal display device in the embodiment.

Specifically, a liquid crystal display device 1 includes a substantially rectangular plate-shaped liquid crystal display panel 10 as a flat display panel. The liquid crystal display device 1 further includes a substantially rectangular plate-shaped face panel 30 which is disposed in front of the liquid crystal display panel 10, a frame 40 which supports the face panel 30, and a bezel 50 which is fixed to the frame 40. The respective structural parts will be described below in greater detail.

The liquid crystal display panel 10 is constructed by attaching a first substrate 11 and a second substrate 12. Both the first substrate 11 and the second substrate 12 are formed in a substantially rectangular plate shape. The liquid crystal display panel 10 has a substantially rectangular active area 100 which displays an image. The active area 100 is formed of a plurality of pixels PX which are arranged in a matrix. In the active area 100, there are provided a plurality of gate wiring lines G extending in a first direction X, a plurality of source wiring lines S extending in a second direction Y which is perpendicular to the first direction X, switching elements SW which are electrically connected to the gate wiring lines G and source wiring lines S, pixel electrodes PE which are electrically connected to the switching elements SW, and a counter-electrode CE which is opposed to the pixel electrodes PE.

In the liquid crystal display panel 10, that side thereof, which is positioned on the second substrate 12 side, serves as a display surface which displays an image. A front surface of the liquid crystal display panel 10 corresponds to that side of the liquid crystal display panel 10, which is opposite to a back light (to be described later) of the liquid crystal display panel 10, that is, an observation position side of the liquid crystal display panel 10.

In the case where the liquid crystal display panel 10 has a plate shape in parallel to an X-Y plane which is defined by the mutually perpendicular first direction X and second direction Y, the liquid crystal display panel 10 has a substantially rectangular shape having a greater length in the first direction X than in the second direction Y. Specifically, the liquid crystal display panel 10 has a first end portion 10A and a second end portion 10B which are opposed to each other, and a third end portion 10C and a fourth end portion 10D which connect the first end portion 10A and second end portion 10B. The first end portion 10A and second end portion 10B extend substantially in parallel to the second direction Y, and correspond to a pair of short sides of the liquid crystal display panel 10. The third end portion 10C and fourth end portion 10D extend substantially in parallel to the first direction X, and correspond to a pair of long sides of the liquid crystal display panel 10. In a third direction Z which is perpendicular to the first direction X and second direction Y, the first substrate 11 of the liquid crystal display panel 10 faces downward and the second substrate 12 faces upward.

The first substrate 11 includes a mounting portion 13 which extends outward from the second substrate 12 in the second direction Y. The mounting portion 13 is formed along the forth end portion 10D. In the liquid crystal display panel 10, at the first end portion 10A, second end portion 10B and third end portion 10C, end faces of the second substrate 12 are positioned immediately above end faces of the first substrate 11. The mounting portion 13 is provided with mounting terminal portions 131 and 132 on which signal sources, such as a driving IC chip and a flexible printed circuit board, are mounted.

The face panel 30 is formed in a substantially rectangular plate shape. In the case where the face panel 30 has a plate shape in parallel to the X-Y plane, the face panel 30 has a substantially rectangular shape having a greater length in the first direction X than in the second direction Y. Specifically, the face panel 30 has a pair of short sides 30A and 30B extending in the second direction Y, and a pair of long sides 30C and 30D extending in the first direction X. The thickness of the face panel 30 in the third direction Z is substantially uniform.

The face panel 30 is disposed between the liquid crystal display panel 10 and the bezel 50. The face panel 30 is positioned above the display surface of the liquid crystal display panel 10, that is, above the second substrate 12. The face panel 30 is composed of a light-transmissive insulative substrate, for instance, a glass substrate.

The length of the face panel 30 in the first direction X is greater than the length of the liquid crystal display panel 10 in the first direction X. Specifically, the face panel 30 includes a first extension portion 31 extending outward from the first end portion 10A of the liquid crystal display panel 10 in the first direction X, and a second extension portion 32 extending outward from the second end portion 10B of the liquid crystal display panel 10 in the first direction X. In other words, the short side 30A of the face panel 30 is positioned outward from the first end portion 10A of the liquid crystal display panel 10, and the short side 30B of the face panel 30 is positioned outward from the second end portion 10B of the liquid crystal display panel 10.

For example, a lenticular lens array 60, which is an optical member, is disposed on the inner surface of the face panel 30, that is, that surface of the face panel 30, which faces the liquid crystal display panel 10. The lenticular lens array 60 is, for example, an optical member for enabling 3-dimensional (3D) display. The lenticular lens array 60 may be formed by direct molding on the face panel 30, or may be attached to the face panel 30 after molding. In any case, the lenticular lens array 60 is held on the face panel 30.

The lenticular lens array 60 is disposed between the first extension portion 31 and second extension portion 32 of the face panel 30. To be more specific, the lenticular lens array 60 is formed with a size which is equal to or larger than the active area 100 of the liquid crystal display panel 10 in the X-Y plane, and the lenticular lens array 60 covers the entirety of the active area 100.

The liquid crystal display panel 10 and the face panel 30 are attached by an adhesive 70. The adhesive 70 is positioned on the outside of the active area 100 of the liquid crystal display panel 10 and is disposed in a linear shape along the first direction X. In the example illustrated, the adhesive 70 is disposed along the third end portion 10C and fourth end portion 10D of the liquid crystal display panel 10, but it should suffice if the adhesive 70 is disposed along at least one of the long sides of the liquid crystal display panel 10. In this example, the adhesive 70 is not disposed along the first end portion 10A or second end portion 10B of the liquid crystal display panel 10.

To be more specific, the adhesive 70 is positioned between the upper surface of the second substrate 12 and the face panel 30, and attaches the second substrate 12 and the face panel 30. The adhesive 70 creates a gap between the second substrate 12 and the face panel 30, and has a function of keeping the gap. The adhesive 70 is, for instance, an ultraviolet-curing resin. The adhesive 70 may include a spacer for gap adjustment, or may not include such a spacer. Thereby, a substantially uniform gap is created between the liquid crystal display panel 10 and the face panel 30. The details of this gap will be described later.

The frame 40 is formed such that the face panel 30, which holds the lenticular lens array 60, can be accommodated in the frame 40 in the state in which the face panel 30 is attached to the liquid crystal display panel 10. The frame 40 is formed, for example, by molding a resin material.

The frame 40 includes a first support portion 41 which supports the first extension portion 31 of the face panel 30, and a second support portion 42 which supports the second extension portion 32 of the face panel 30. The first support portion 41 and second support portion 42 extend in the second direction Y, and their support surfaces for supporting the face panel 30 are formed in a substantially flat shape. In addition, the distance between the first support portion 41 and second support portion 42 in the first direction X is equal to or greater than the length of the liquid crystal display panel 10 in the first direction X.

In the state in which the first extension portion 31 and second extension portion 32 of the face panel 30 are supported on the first support portion 41 and second support portion 42 of the frame 40, the liquid crystal display panel 10, which is held on the face panel 30, does not come in contact with the first support portion 41 or second support portion 42 and is positioned between the first support portion 41 and second support portion 42.

In addition, the frame 40 has a bottom surface 43 which is recessed from the first support portion 41 and second support portion 42 and forms a step. In the example illustrated, the bottom surface 43 is formed in a frame shape. An opening 44 is formed in a central part of the bottom surface 43. The step along the third direction Z between the first support portion 41 and second support portion 42 and the bottom surface 43 is larger than the thickness of the liquid crystal display panel 10 in the third direction Z.

In the state in which the face panel 30 is supported on the frame 40, the first end portion 10A, second end portion 10B, third end portion 10C and fourth end portion 10D of the liquid crystal display panel 10 that is held on the face panel 30 are opposed to the bottom surface 43, but are spaced apart from the bottom surface 43. In this manner, the liquid crystal display panel 10 is not in contact with the frame 40.

An elastic member 80 is interposed between the liquid crystal display panel 10 and the frame 40. In the example illustrated, the elastic member 80 is disposed on those parts of the bottom surface 43, which are opposed to the third end portion 10C and fourth end portion 10D of the liquid crystal display panel 10. The elastic member 80 is disposed in a linear shape along the first direction X. Specifically, the elastic member 80 is disposed along the pair of long sides of the liquid crystal display panel 10, but not disposed along the second direction Y. Thus, no elastic member is interposed between the first end portion 10A and second end portion 10B of the liquid crystal display panel 10 and the bottom surface 43 of the frame 40.

The elastic member 80 is formed of a rubber-like elastic member of, e.g. silicone rubber. In the present embodiment, in the state in which the face panel 30 is supported on the frame 40, the third end portion 10C and fourth end portion 10D of the liquid crystal display panel 10 are put in contact with the elastic member 80, but may be spaced apart from the elastic member 80.

Notch portions 45 and 46 for leading the flexible printed circuit board (not shown), which is mounted on the mounting terminal portions 131 and 132 of the liquid crystal display panel 10, to the outside of the frame 40 are formed in the frame 40.

The bezel 50 is formed in a substantially rectangular frame shape. A substantially rectangular opening portion 51 is formed in the bezel 50 immediately above the active area 100 of the liquid crystal display panel 10. The bezel 50 is fastened to the frame 40.

Next, a description is given of the structure of a transmissive liquid crystal display panel which is an example of the liquid crystal display panel 10.

FIG. 2 is a cross-sectional view which schematically shows the structure of the liquid crystal display panel 10.

Specifically, the liquid crystal display panel 10 comprises a first substrate 11, a second substrate 12, and a liquid crystal layer LQ which is held between the first substrate 11 and the second substrate 12. The first substrate 11 and the second substrate 12 are formed by using an insulative substrate such as a glass substrate or a plastic substrate. The first substrate 11 and the second substrate 12 are attached by a sealant SE.

In each of pixels PX of an active area 100 which displays an image, the first substrate 11 includes, on the surface thereof facing the second substrate 12, a plurality of switching elements SW and pixel electrodes PE which are connected to the respective switching elements SW. The second substrate 12 includes a counter-electrode CE on the surface thereof facing the first substrate 11. The counter-electrode CE faces the plural pixel electrodes PE via the liquid crystal layer LQ.

The switching element SW is composed of, for example, a thin-film transistor (TFT). The pixel electrodes PE and counter-electrode CE are formed by using a light-transmissive electrically conductive material such as indium tin oxide (ITO) or indium zinc oxide (IZO).

An alignment film (not shown) is interposed between the pixel electrodes PE and the liquid crystal layer LQ, and also between the counter-electrode CE and the liquid crystal layer LQ. In addition, a spacer (not shown) is interposed between the first substrate 11 and second substrate 12, and the liquid crystal layer LQ with a substantially uniform thickness is formed. The liquid crystal display panel 10 of a color display type includes color filters (not shown) disposed on the first substrate 11 or second substrate 12, and includes a plurality of kinds of pixels, for example, a red pixel for displaying red (R), a green pixel for displaying green (G) and a blue pixel for displaying blue (B).

The structure of the liquid crystal display panel 10 is not limited to the structure shown in FIG. 2. The counter-electrode CE, as well as the pixel electrodes PE, may be provided on the first substrate 11. In addition, the liquid crystal mode is not particularly limited. Applicable liquid crystal modes include a mode which mainly makes use of a vertical electric field or an oblique electric field, such as a TN (Twisted Nematic) mode, an OCB (Optically Compensated Bend) mode or a VA (Vertical Aligned) mode, and a mode which mainly makes use of a transverse electric field, such as an IPS (In-Plane Switching) mode or an FFS (Fringe Field Switching) mode.

A first polarizer PL1 is disposed on the outer surface of the first substrate 11. A second polarizer PL2 is disposed on the outer surface of the second substrate 12. Among the first polarizer PL1 and second polarizer PL2, at least the second polarizer PL2 has its surface subjected to anti-glare treatment. In the meantime, where necessary, various kinds of optical elements, such as retardation plates, may be disposed between the first substrate 11 and the first polarizer PL1, and between the second substrate 12 and the second polarizer PL2.

Next, the face panel 30 which holds the lenticular lens array 60 is described.

FIG. 3 is a cross-sectional view which schematically shows the structure of the face panel 30 which holds the lenticular lens array 60.

The face panel 30 is, for example, a glass substrate with a substantially uniform thickness. The lenticular lens array 60 is composed of a plurality of cylindrical lenses CL which are arranged in the first direction X. Each cylindrical lens CL is opposed to the second polarizer PL2. Each cylindrical lens CL extends in a direction substantially parallel to the short side of the liquid crystal display panel 10, that is, in the second direction Y. In addition, each cylindrical lens CL has an apex CLT projecting toward the liquid crystal display panel 10. Specifically, the surface of the cylindrical lens CL is a cylindrical surface. Of the cylindrical surface, the most projecting position, that is, the position closest to the second polarizer PL2, corresponds to the apex CLT of the cylindrical lens CL. The generating line of the cylindrical surface of each cylindrical lens CL extends in the second direction Y. The lenticular lens array 60 is formed of, for example, a light-transmissive resin material.

Next, a description is given of the liquid crystal display panel 10 and face panel 30 which are attached by the adhesive 70.

FIG. 4 is a plan view which schematically shows the structure of the liquid crystal display panel 10 and the face panel 30 which are attached by the adhesive 70.

That part of the face panel 30, which extends outward from the first end portion 10A of the liquid crystal display panel 10, corresponds to the first extension portion 31. That part of the face panel 30, which extends outward from the second end portion 10B of the liquid crystal display panel 10, corresponds to the second extension portion 32. The lenticular lens array 60 is formed with a size which is equal to or larger than the active area 100 in the liquid crystal display panel 10, and the lenticular lens array 60 is positioned immediately above the active area 100.

The adhesive 70 is disposed at a position which overlaps neither the active area 100 nor the lenticular lens array 60, and the adhesive 70 is formed linearly along the first direction X. Specifically, the adhesive 70 is positioned between the active area 100 or lenticular lens array 60 and the third end portion 10C of liquid crystal display panel 10, and between the active area 100 or lenticular lens array 60 and the fourth end portion 10D of liquid crystal display panel 10.

In the liquid crystal display panel 10, the length of the first substrate 11 in the second direction Y is greater than the length of the second substrate 12 in the second direction Y, and that part of the first substrate 11, which extends outward from the second substrate 12, corresponds to the mounting portion 13. In addition, the length of the first substrate 11 in the second direction Y is greater than the length of the face panel 30 in the second direction Y. The mounting portion 13 of the first substrate 11 is exposed from the face panel 30.

Figure 5:
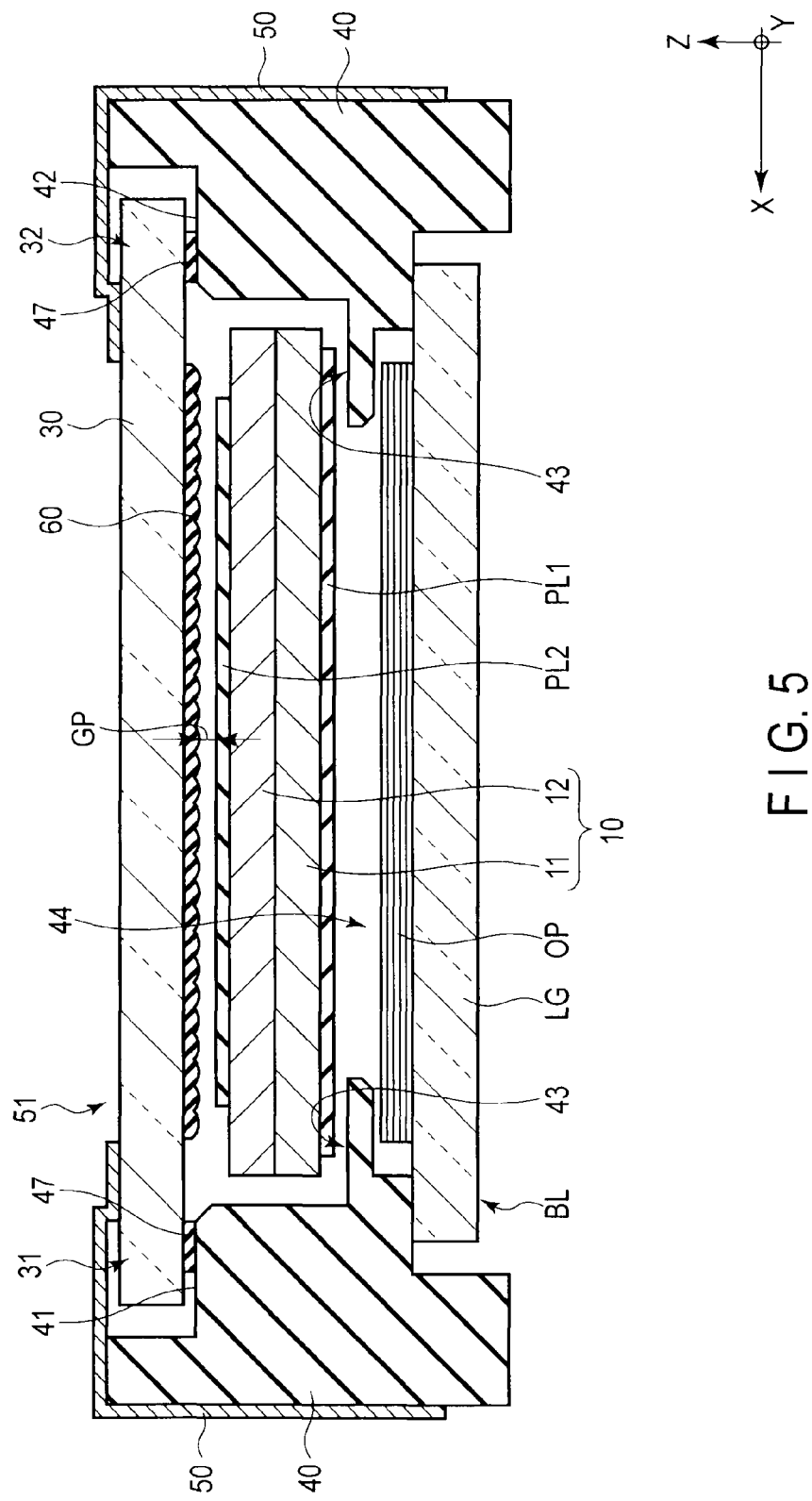
FIG. 5 is a cross-sectional view which schematically shows a cross-sectional structure, taken along line A-A, of the liquid crystal display device in which the liquid crystal display panel and face panel shown in FIG. 4 are accommodated in a frame.

FIG. 5 is a cross-sectional view which schematically shows a cross-sectional structure, taken along line A-A, of the liquid crystal display device 1 in which the liquid crystal display panel 10 and face panel 30 shown in FIG. 4 are accommodated in the frame 40.

The first extension portion 31 of the face panel 30 is supported on the first support portion 41 of the frame 40. Similarly, the second extension portion 32 of the face panel 30 is supported on the second support portion 42 of the frame 40. In the example illustrated, the first extension portion 31 and second extension portion 32 are fixed to the first support portion 41 and second support portion 42 by double coated adhesive tapes 47.

The bezel 50 which is fixed to the frame 40 covers the first extension portion 31 and second extension portion 32. In the example illustrated, the bezel 50 is in contact with the face panel 30, but a gap may be created between the bezel 50 and the face panel 30 (it is not necessary that the bezel 50 be in contact with the face panel 30). The face panel 30 may be fixed by the clamping of the first extension portion 31 and second extension portion 32 between the frame 40 and the bezel 50.

The lenticular lens array 60, which is held on the face panel 30, and the liquid crystal display panel 10, which is adhered to the face panel 30, are positioned inside the first support portion 41 and second support portion 42. The liquid crystal display panel 10 is spaced apart from the frame 40, and a gap is created between the first substrate 11 and the bottom surface 43.

The first polarizer PL1, which is disposed on the outer surface of the first substrate 11, faces the opening formed in the frame 40. In addition, the second polarizer PL2, which is disposed on the outer surface of the second substrate 12, faces the lenticular lens array 60 and is spaced apart from the lenticular lens array 60. Specifically, an air layer is formed between the lenticular lens array 60 and the second polarizer PL2. In the meantime, the air layer may not be formed. The opening portion 51 of the bezel 50 is positioned immediately above the lenticular lens array 60.

The frame 40 accommodates a backlight BL on the back side of the liquid crystal display panel 10, that is, on the side facing the first polarizer PL1. The backlight BL illuminates the liquid crystal display panel 10 from the opening 44. Various types are applicable to the backlight BL. In addition, light sources, which make use of light-emitting diodes or cold cathode tubes, are applicable to the backlight BL. For example, the backlight BL is configured to include a light guide LG and a plurality of optical sheets OP.

FIG. 6 is a cross-sectional view which schematically shows a cross-sectional structure, taken along line B-B, of the liquid crystal display device 1 in which the liquid crystal display panel 10 and face panel 30 shown in FIG. 4 are accommodated in the frame 40.

In the example illustrated, the adhesive 70, which attaches the liquid crystal display panel 10 and face panel 30, is disposed on both sides sandwiching the second polarizer PL2 and lenticular lens array 60. The adhesive 70 attaches the second substrate 12 (strictly speaking, the insulative substrate constituting the second substrate 12) of the liquid crystal display panel 10 and the face panel 30, in the state in which a predetermined gap is created between the second polarizer PL2 and the lenticular lens array 60.

The liquid crystal display panel 10 is spaced apart from the bottom surface 43 of the frame 40. In the example illustrated, the first substrate 11 of the liquid crystal display panel 10 is put in contact with the elastic member 80 that is disposed on the bottom surface 43 of the frame 40, but the first substrate 11 may be spaced apart from the elastic member 80. In the meantime, the first substrate 11 may be adhered to the elastic member 80. The elastic member 80 is disposed on the bottom surface 43 on each of both sides which sandwich the opening 44 that is formed in the frame 40.

A detailed description is given of the gap GP which is created between the liquid crystal display panel 10 and the face panel 30. Strictly speaking, the gap GP is a distance in the third direction Z between the surface of the second polarizer PL2 and the apex of the cylindrical lens CL, as shown in FIG. 5. The adhesive 70 is configured to substantially uniformly form the gap GP.

In order to realize 3D display, the optical distance between the apex CLT of the cylindrical lens CL of the lenticular lens array 60 and the pixel (e.g. color filter) included in the liquid crystal display panel 10 is important. Although the optimal optical distance is determined mainly by the design of the lens, consideration needs to be given to the refractive index of each member and the variance in thickness of each member. In the present embodiment, the optical distance (gap GP) between the apex CLT of the cylindrical lens CL of the lenticular lens array 60 and the surface of the second polarizer PL2 is substantially controlled. This gap GP is adjusted by the pressure that is applied by an attaching device when the liquid crystal display panel 10 and the face panel 30 are attached. In the present embodiment, the gap GP can be set in the range of zero to about 400 µm. The gap GP immediately after fabrication is set within the range of 120±50 µm.

The above-described example corresponds to the structure in which the adhesive 70 is disposed along the pair of long sides of the liquid crystal display panel 10 (i.e. the third end portion 10C and fourth end portion 10D). Another structure example will be described below.

Figure 7:
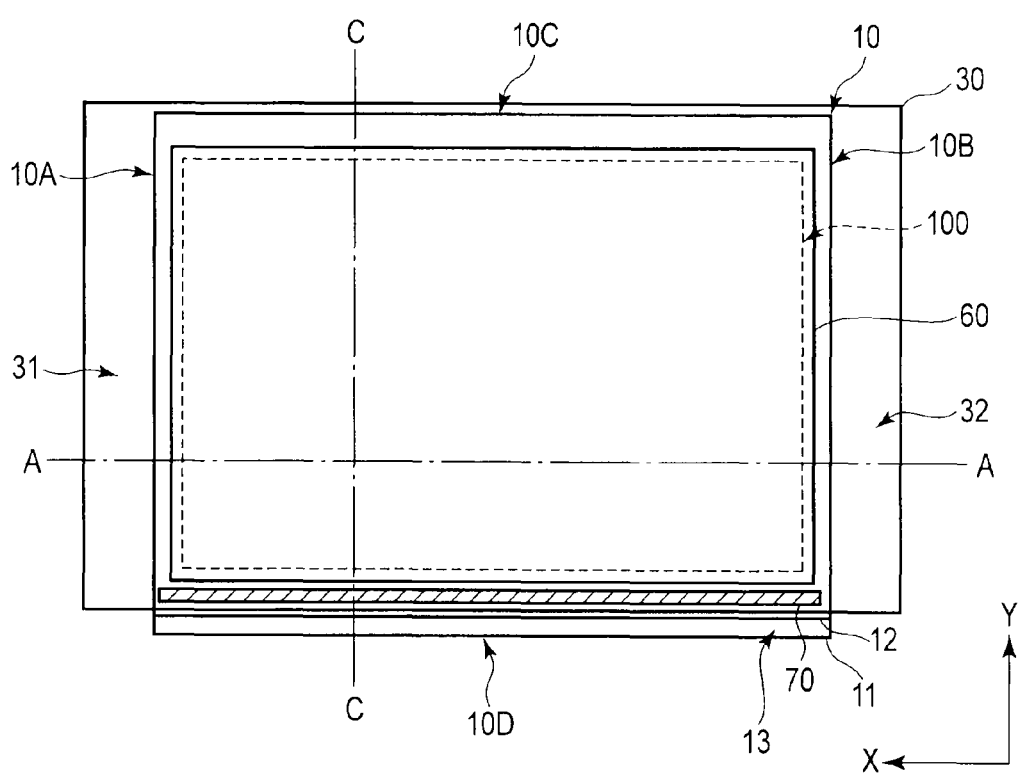
FIG. 7 is a plan view which schematically shows another structure of the liquid crystal display panel and the face panel which are attached by an adhesive.

FIG. 7 is a plan view which schematically shows another structure of the liquid crystal display panel 10 and the face panel 30 which are attached by the adhesive 70.

The example shown in FIG. 7 differs from the example shown in FIG. 4 in that the adhesive 70 is disposed along only one long side (the fourth end portion 10D in the illustrated example) of the liquid crystal display panel 10. Specifically, in the example illustrated, the adhesive is not disposed along the other long side (i.e. the third end portion 100) of the liquid crystal display panel 10. In the other respects, the structure shown in FIG. 7 is identical to the structure shown in FIG. 4, so a description of the other respects is omitted. In addition, a cross-sectional structure, taken along line A-A, of the liquid crystal display device 1 shown in FIG. 7 is identical to the structure of the example shown in FIG. 5, so the depiction and description of this cross-sectional structure are omitted.

Figure 8:
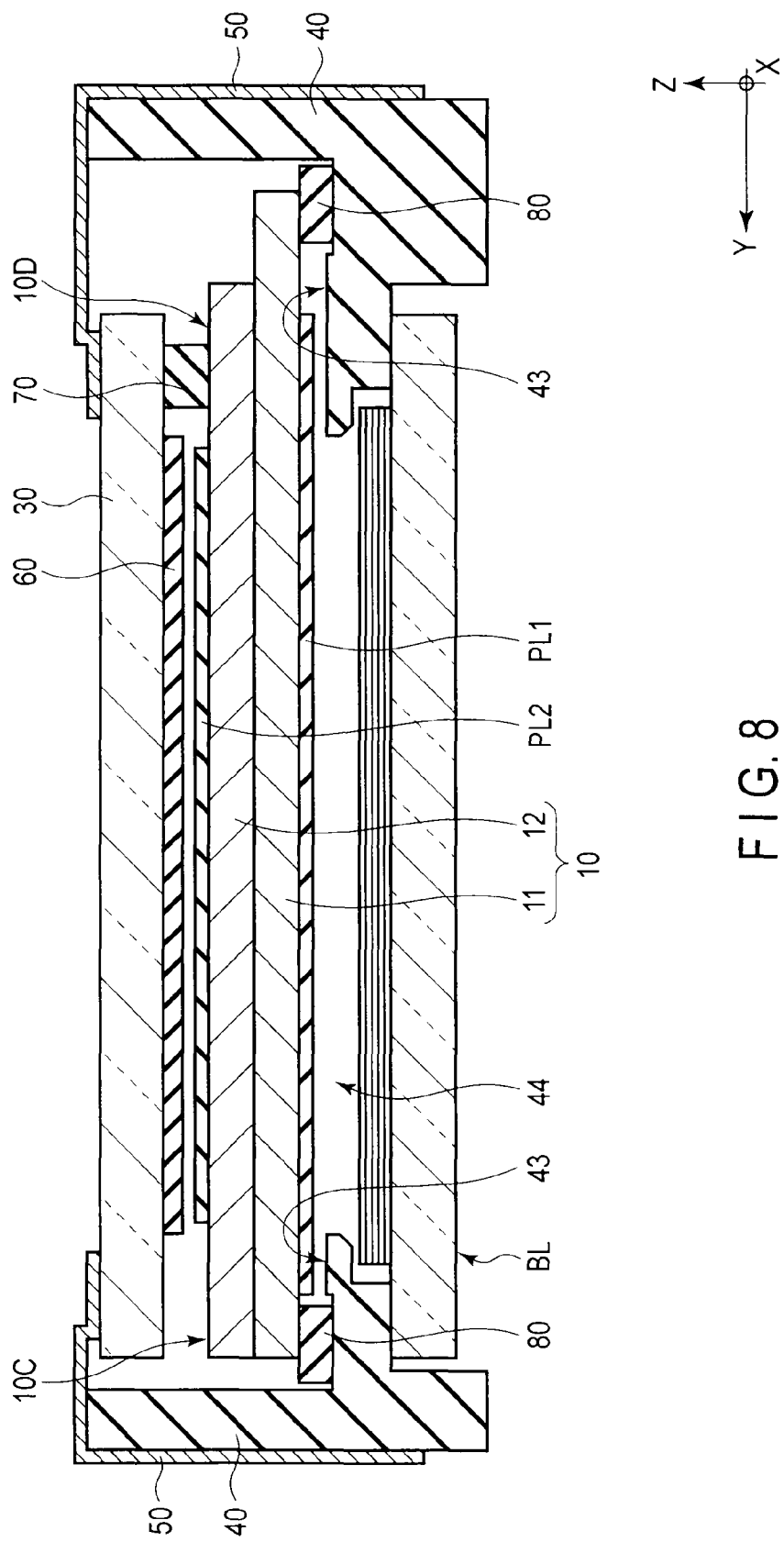
FIG. 8 is a cross-sectional view which schematically shows a cross-sectional structure, taken along line C-C, of the liquid crystal display device in which the liquid crystal display panel and face panel shown in FIG. 7 are accommodated in the frame.

FIG. 8 is a cross-sectional view which schematically shows a cross-sectional structure, taken along line C-C, of the liquid crystal display device 1 in which the liquid crystal display panel 10 and face panel 30 shown in FIG. 7 are accommodated in the frame 40.

The adhesive 70 is disposed along only the fourth end portion 10D of the liquid crystal display panel 10. In the meantime, that side of the face panel 30, which is positioned on the third end portion 100 side of the liquid crystal display panel 10, is held by the bezel 50. As regards the end portion (the third end portion 10C in the illustrated example) along the other long side of the liquid crystal display panel 10, the first substrate 11 is adhered to the elastic member 80 which is disposed on the frame 40. Also as regards the fourth end portion 10D of the liquid crystal display panel 10, the first substrate 11 may be adhered to the elastic member 80.

Next, the process of manufacturing the liquid crystal display device of the present embodiment is described in brief.

To begin with, for example, the lenticular lens array 60 is formed, for example, by molding an acrylic resin. The lenticular lens array 60 is attached to the face panel 30. On the other hand, an ultraviolet-curing resin is coated as the adhesive 70 on the outside of the active area 100 of the liquid crystal display panel 10 which is separately formed. When the ultraviolet-curing resin is coated, such techniques as dispensing by a dispenser, screen printing or ink-jet printing is generally applicable. These techniques are selectively used in accordance with the precision of coating, the time of coating (lead time) or the degree of freedom of patterning, which is required in the process.

Subsequently, the face panel 30 having the lenticular lens array 60 is provisionally placed on the liquid crystal display panel 10. Then, the pixel PX of the liquid crystal display panel 10 and the optical focal position of each of the cylindrical lenses, which constitute the lenticular lens array 60, are aligned in the first direction X, the second direction Y, and a rotational direction θ in the X-Y plane. In particular, alignment with high precision needs to be performed in the first direction X and the rotational direction θ. By performing the process of curing the ultraviolet-curing resin, the face panel 30 is fixed to the liquid crystal display panel 10 at the correct position.

In this case, the structure in which the lenticular lens array 60 faces the liquid crystal display panel 10 is adopted because of the durability of the product (the lens structure is not exposed to the outside) and the advantage in the manufacturing process (easy adsorption/fixation at the time of attachment, and less possibility of damage to the lens structure).

While the set of the liquid crystal display panel 10 and face panel 30 is fixed to the frame 40, the backlight BL is fixed. Further, the bezel 50 is fixed to the frame 40, and the liquid crystal display device having the 3D display function is manufactured.

As the usable temperature range of the product, the temperature of −10° C. to +70° C. is required. In the case of the structure in which the adhesive 70 is disposed in a rectangular frame shape surrounding the active area 100, thereby to firmly fix the liquid crystal display panel 10 and face panel 30, the inventor has found that peculiar non-uniformity is visually recognized in the high-temperature environment of, in particular, 60° C. or above. Modes of occurrence of nonuniformity will be described below.

As has been described above, according to design specifications, the lenticular lens array 60 is spaced apart from the second polarizer PL2. However, in the high-temperature environment, the lenticular lens array 60 may locally be put in close contact with the second polarizer PL2, due to warpage of members, for example, due to warpage of the face panel 30 toward the liquid crystal display panel 10. In such a case, when black is displayed on the entirety of the active area 100 of the liquid crystal display panel 10, a region where the lenticular lens array 60 is in contact with the second polarizer PL2 is visually recognized as nonuniformity. In addition, even if the warpage of the face panel 30 is eliminated when the temperature of the environment is restored to room temperature, the close contact between the lenticular lens array 60 and the second polarizer PL2 is hardly released, and such deformation may occur that the cell gap of the liquid crystal display panel 10 locally increases. In such a case, too, similar nonuniformity is visually recognized.

In another mode, the lenticular lens array 60 locally comes in contact with the second polarizer PL2 in the high-temperature environment. When the pressure of close contact further increases, the apex of the cylindrical surface, which defines the cylindrical lens, may deform and partly become flat. This is due to softening at high temperatures since the material of the cylindrical lens is a resin material such as an acrylic resin. In particular, as regards the acrylic resin that is used for the lenticular lens array 60, importance is placed on the shape workability. Thus, in some cases, the heat resistance of this acrylic resin is lower than general acrylic resins. For example, the temperature at which general acrylic resins soften is about 80° C., while the temperature at which the acrylic resin for lenticular lens arrays, which is applied to the present embodiment, is less than about 60° C. Such deformation of the apex of the cylindrical lens leads to degradation in optical capability. Even if the deformation is small, such deformation occurs successively on a plurality of cylindrical lenses. Thus, even in the non-operative state, ambient light, which is incident from the surface of the product, is reflected by the surface of the second polarizer PL2, and the deformation is visually recognized as nonuniformity. Normally, reflective light, which has passed through the cylindrical lens, is spatially continuously distributed. However, if the apex of the cylindrical lens is deformed to be flat, the reflective light, which has passed through this part, is not continuous and is, hence, easily visually recognized. In particular, when the reflectance of the surface of the second polarizer PL2 is high as in the case where the second polarizer PL2 is subjected to surface treatment such as hard-coat treatment, even a slight deformation of the apex of the cylindrical lens is easily visually recognized as nonuniformity. Such nonuniformity may become a defect in external appearance of the product, which is different from a defect at a time of display.

In still another mode, a stress occurs in the liquid crystal display panel 10 and face panel 30 due to temperature cycles, and the liquid crystal display panel 10 may be held in a deformed state. For example, the liquid crystal display panel 10 and face panel 30 are deformed in the high-temperature environment, while the adhesive 70 which fixes these members is softened and misalignment (creep) occurs between the liquid crystal display panel 10 and face panel 30. Thereafter, when the temperature environment is restored to a room-temperature environment, the adhesive 70 is hardened in the state in which the liquid crystal display panel 10 is deformed, and a stress may occur in the liquid crystal display panel 10 and face panel 30 in accordance with the amount of creep. In such a case, the cell gap in the liquid crystal display panel 10 locally varies, and when black is displayed on the entirety of the active area 100 of the liquid crystal display panel 10, nonuniformity is visually recognized. The stress occurring at this time also causes the deformation of the apex of the cylindrical lens as described above.

According to the structure of the present embodiment, the adhesive 70, which attaches the liquid crystal display panel 10 and face panel 30 to each other, is disposed along at least one of the long sides of the liquid crystal display panel 10. Specifically, the adhesive 70 is disposed along the pair of long sides of the liquid crystal display panel 10. Alternatively, the adhesive 70 is disposed along only one long side, and the end portion of the liquid crystal display panel 10 along the other long side is adhered to the elastic member 80 which is disposed on the frame 40.

Thereby, the distance of coating of the adhesive 70 can be decreased, compared to the case in which the liquid crystal display panel 10 and face panel 30 are attached by coating the adhesive 70 in a rectangular frame shape. It is possible, therefore, to suppress the occurrence of stress between the liquid crystal display panel 10 and face panel 30 due to the adhesive 70. In addition, in the structure in which the adhesive 70 is disposed along only one long side of the liquid crystal display panel 10, one of ends of the face panel 30 are not fixed by the adhesive 70, and therefore the stress that has occurred can relieve in the second direction Y. Since no shape variation occurs in the cylindrical lens in the second direction Y, the misalignment occurring at this time does not greatly affect the image quality. Moreover, the amount of coated adhesive can further be decreased, and the cost can further be reduced.

Thus, the deformation of the liquid crystal display panel 10 can be suppressed, and also the deformation of the cylindrical lenses can be suppressed. Accordingly, since the occurrence of nonuniformity is suppressed and a defect in external appearance and a defect at a time of black display can be eliminated, a high-quality liquid crystal display device can be provided.

According to the structure of the present embodiment, the second polarizer PL2 has its surface subjected to the anti-glare treatment. Thus, even if the apex of the cylindrical lens is deformed, the reflective light at the surface of the second polarizer PL2 can be scattered, and the visibility of nonuniformity of the reflective light can be lowered. Therefore, the occurrence of a defect in external appearance of the product can be suppressed. In the present embodiment, 20% to 30% are particularly proper as the haze of the second polarizer PL2.

In the present embodiment, the difference between the Young's modulus of the glass substrate, which constitutes the face panel 30, and the Young's modulus of the glass substrate, which constitutes the liquid crystal display panel 10, should desirably be about 10% or less, and the linear expansion coefficient of each of the glass substrates should desirably be on the same order. In this manner, by the designing in consideration of the physical properties of the respective members, the difference in deformation amount between the members at high temperatures is decreased, and therefore the stress occurring between both structural members can be decreases and the deformation of the apex of the cylindrical lens can be suppressed.

Furthermore, according to the structure of the present embodiment, the lenticular lens array 60, which is attached to the face panel 30, includes cylindrical lenses which extend in a direction substantially parallel to the short sides of the liquid crystal display panel 10, while the liquid crystal display panel 10 and face panel 30 are attached by the adhesive 70 which is disposed along the long sides of the liquid crystal display panel 10. Hence, even if the liquid crystal display panel 10 and face panel 30 thermally expand, misalignment between the pixels PX and the cylindrical lenses can be suppressed.

Besides, according to the structure of the present embodiment, the paired extension portions of the face panel 30, which is adhered to the liquid crystal display panel 10, are supported by the frame 40, and the liquid crystal display panel 10 is spaced apart from the frame 40. It is possible, therefore, to suppress breakage of the liquid crystal display panel 10, which occurs at the contact point with the frame 40, as a starting point of breakage, due to the stress applied from the outside.

As has been described above, according to the present embodiment, a high-quality flat panel display device can be provided.

The present embodiment has been described, taking the liquid crystal display device as an example of the flat panel display device. However, the embodiment is applicable to various types of flat panel display devices, such as an organic electroluminescence display device and a plasma display device.

In the present embodiment, the description has been given of the structure in which the transmissive-type liquid crystal display panel is applied as the liquid crystal display panel 10. However, a reflective-type liquid crystal display panel can be applied as the liquid crystal display panel 10, and in this case the backlight for illuminating the liquid crystal display panel is needless.

In the present embodiment, the adhesive 70 for fixing the liquid crystal display panel 10 and face panel 30 is disposed along the long sides of the liquid crystal display panel 10. Alternatively, the adhesive 70 may be disposed along the short sides of the liquid crystal display panel 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A flat panel display device comprising:
   a flat display panel comprising a pair of long sides and a pair of short sides;
   a face panel disposed in front of the flat display panel;
   a lenticular lens array disposed on an inner surface of the face panel, the inner surface facing the flat display panel; and
   an adhesive which is disposed along at least one of the pair of long sides of the flat display panel, excluding the pair of short sides of the flat display panel, and attaches the flat display panel and the face panel to each other,
   wherein the lenticular lens array comprises a cylindrical lens which extends in a direction substantially parallel to the short sides of the flat display panel and has an apex projecting toward the flat display panel.

2. The flat panel display device of claim 1, wherein the flat display panel comprises a polarizer opposed to the cylindrical lens.

3. The flat panel display device of claim 2, wherein the polarizer comprises a surface subjected to anti-glare treatment.

4. The flat panel display device of claim 2, wherein the cylindrical lens is spaced apart from the polarizer to define a gap between the cylindrical lens and the polarizer.

5. The flat panel display device of claim 4, wherein the gap is 120±50 µm.

6. The flat panel display device of claim 1, wherein the face panel comprises a pair of extension portions extending outward from the pair of short sides of the flat display panel, and the lenticular lens array is disposed between the pair of extension portions.

7. The flat panel display device of claim 6, further comprising a frame which supports the face panel.

8. The flat panel display device of claim 7, wherein the frame supports the pair of extension portions of the face panel.

9. The flat panel display device of claim 8, wherein the pair of extension portions of the face panel are fixed to the frame by a double coated adhesive tape.

10. The flat panel display device of claim 7, further comprising an elastic member interposed between the flat display panel and the frame.

11. The flat panel display device of claim 10, wherein the elastic member is disposed along the pair of long sides of the flat display panel.

12. The flat panel display device of claim 1, wherein the adhesive is disposed along the pair of long sides of the flat display panel.

13. The flat panel display device of claim 7, wherein the adhesive is disposed along one of the pair of long sides of the flat display panel, and an end portion of the flat display panel, which is along the other of the pair of long sides of the flat display panel, is adhered to an elastic member disposed on the frame.

14. The flat panel display device of claim 7, wherein the flat display panel comprises a mounting terminal portion on which a flexible printed circuit board is amounted, and
the frame includes a notch portion configured to lead the flexible printed circuit board, which is mounted on the mounting terminal portion, to an outside of the frame.

15. The flat panel display device of claim 1, wherein the flat display panel comprises a first substrate, a second substrate attached to the first substrate, a liquid crystal layer held between the first substrate and the second substrate, and a polarizer which is disposed on an outer surface of the second substrate, is opposed to the cylindrical lens, and has a surface subjected to anti-glare treatment.

\* \* \* \* \*